(12) United States Patent
Amarilio

(10) Patent No.: US 10,755,658 B2
(45) Date of Patent: Aug. 25, 2020

(54) FAULT TOLERANT LCD DISPLAY USING REDUNDANT DRIVERS, SELECT LINES, DATA LINES, AND SWITCHES

(71) Applicant: Elbit Systems Ltd., Haifa (IL)

(72) Inventor: Errikos Amarilio, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 16/348,076

(22) PCT Filed: Nov. 5, 2017

(86) PCT No.: PCT/IL2017/051205
§ 371 (c)(1),
(2) Date: May 7, 2019

(87) PCT Pub. No.: WO2018/087750
PCT Pub. Date: May 17, 2018

(65) Prior Publication Data
US 2019/0259346 A1   Aug. 22, 2019

(30) Foreign Application Priority Data
Nov. 8, 2016 (IL) .......................... 248845

(51) Int. Cl.
*G09G 3/36* (2006.01)
*G02F 1/1368* (2006.01)
*G02F 1/1362* (2006.01)

(52) U.S. Cl.
CPC ......... *G09G 3/3648* (2013.01); *G02F 1/1368* (2013.01); *G09G 3/3607* (2013.01);
(Continued)

(58) Field of Classification Search
CPC .. G09G 3/3648; G09G 3/3677; G09G 3/3607; G09G 3/3688; G09G 2300/0439;
(Continued)

(56) References Cited

U.S. PATENT DOCUMENTS 4,851,827 A   7/1989 Nicholas
5,063,378 A   11/1991 Roach
(Continued)

FOREIGN PATENT DOCUMENTS

EP   0814454 A2   12/1997
EP   1335343 A2   8/2003
(Continued)

OTHER PUBLICATIONS

International Search Report and Written Opinion dated Mar. 1, 2018, for PCT/IL17/51205, filed Nov. 5, 2017.
(Continued)

*Primary Examiner* — Darlene M Ritchie
(74) *Attorney, Agent, or Firm* — Brown Rudnick LLP

(57) ABSTRACT

A display device comprising: a plurality of pixels, each pixel including at least one sub-pixel; each sub-pixel comprising: a drivable visual segment, being operative to exhibit at least a first visible state and a second visible state; a first electrical potential setting section coupled with the drivable visual segment and with a first select terminal and a first data terminal, the first electrical potential setting section being operative to drive the drivable visual segment, at least from the first visible state to the second visible state; a second electrical potential setting section coupled with the drivable visual segment and with a second select terminal and a second data terminal, the second electrical potential setting section being operative to drive the drivable visual segment, independently from the first electrical potential setting section, at least from the first visible state to said second visible state.

18 Claims, 9 Drawing Sheets

(52) U.S. Cl.
CPC ..... *G02F 1/136204* (2013.01); *G09G 3/3677* (2013.01); *G09G 3/3688* (2013.01); *G09G 2300/0439* (2013.01); *G09G 2300/0452* (2013.01); *G09G 2300/0809* (2013.01); *G09G 2330/021* (2013.01); *G09G 2330/08* (2013.01)

(58) Field of Classification Search
CPC ....... G09G 2300/0809; G09G 2330/08; G09G 2330/10; G09G 2330/12; G09G 2380/12; G02F 2001/136254; G02F 1/136259; G02F 2201/506; G02F 2201/508
See application file for complete search history.

(56) References Cited

U.S. PATENT DOCUMENTS

| | | | |
|---|---|---|---|
| 5,151,632 A | | 9/1992 | Troxell |
| 5,555,001 A | | 9/1996 | Lee et al. |
| 5,859,627 A | | 1/1999 | Hoshiya et al. |
| 6,060,941 A | * | 5/2000 | Brownlow ........... G09G 3/3688 327/425 |
| 6,191,830 B1 | * | 2/2001 | Gogna ............... G02F 1/136213 349/38 |
| 6,417,868 B1 | | 7/2002 | Bock et al. |
| 6,462,801 B2 | | 10/2002 | Shin et al. |
| 7,728,788 B1 | | 6/2010 | Echols et al. |
| 8,832,748 B2 | | 9/2014 | Bushell et al. |
| 9,013,666 B2 | | 4/2015 | Bushell et al. |
| 2002/0047852 A1 | | 4/2002 | Inukai et al. |
| 2003/0025658 A1 | * | 2/2003 | Janssen ................. G02F 1/1309 345/87 |
| 2008/0007504 A1 | | 1/2008 | Kawaura et al. |
| 2010/0214273 A1 | | 8/2010 | Shirouzu et al. |
| 2011/0102691 A1 | | 5/2011 | Uehara |
| 2011/0254879 A1 | | 10/2011 | Mori et al. |
| 2013/0120664 A1 | | 5/2013 | Bushell et al. |
| 2013/0176318 A1 | * | 7/2013 | Dunn ....................... G09G 3/36 345/501 |
| 2013/0278575 A1 | | 10/2013 | Ogawa |
| 2014/0292732 A1 | | 10/2014 | Niioka et al. |
| 2017/0169769 A1 | * | 6/2017 | Fletcher ................ G09G 3/3648 |
| 2017/0345363 A1 | * | 11/2017 | Brooks ..................... G09G 3/32 |
| 2018/0075790 A1 | * | 3/2018 | Abernathy ............. G09G 3/006 |

FOREIGN PATENT DOCUMENTS

| | | |
|---|---|---|
| JP | 1-130131 | 5/1989 |
| JP | 3-237434 B2 | 12/2001 |
| JP | 2010-20023 A | 1/2010 |
| JP | 61-20091 B2 | 4/2017 |
| WO | 9408331 A1 | 4/1994 |

OTHER PUBLICATIONS

Office Action issued dated Nov. 19, 2019, for Japanese Application No. 2019-523630.

Extended European Search Report issued in European Application No. 17870564.6, dated Apr. 22, 2020, 14 pages.

* cited by examiner

FAULT TOLERANT LCD DISPLAY USING REDUNDANT DRIVERS, SELECT LINES, DATA LINES, AND SWITCHES

FIELD OF THE DISCLOSED TECHNIQUE

The disclosed technique relates to systems and methods for providing visual display, in general, and to systems and methods for redundancy in visual display, in particular.

BACKGROUND OF THE DISCLOSED TECHNIQUE

Methods and systems for providing visual display are known in the art. One technique for providing visual display is called Active-Matrix Liquid-Crystal Display (AMLCD) in which each pixel includes a display element (e.g., liquid crystal) a memory storage for retaining the electrical state of that pixel and a transistor for setting that electrical state.

Reference is now made to FIGS. 1A, 1B, 10 and 1D. FIG. 1A is a schematic illustration of a conventional AMLCD display, generally referenced 10, which is known in the art. FIGS. 1B and 1C are schematic illustrations of a single electrical potential setting section, generally referenced $24A_R$ of display 10 of FIG. 1A, which is known in the art, at different states. FIG. 1D is a schematic illustration of a specific implementation of a sub-pixel, generally referenced $22A_R$, of display 10 of FIG. 1A, which is known in the art.

Display 10 includes a plurality of pixels 20A, 20B, 20C and 20D. Each of pixels 20A, 20B, 20C and 20D includes three respective sub-pixels $22A_R$, $22A_G$, $22A_B$, $22B_R$, $22B_G$, $22B_B$, $22C_R$, $22C_G$, $22C_B$, $22D_R$, $22D_G$ and $22D_B$. It is noted that a typical display such as display 10, may contain any number of pixels, from a few thousands and up to several millions and more, and that FIG. 1A, provides a mere illustration of a very small portion of a typical display. Each of sub-pixels $22A_R$, $22A_G$, $22A_B$, $22B_R$, $22B_G$, $22B_B$, $22C_R$, $22C_G$, $22C_B$, $22D_R$, $22D_G$ and $22D_B$ includes a liquid crystal section directed at a predetermined wavelength range such as Red (R), Green (G) and blue (B), a respective capacitor (not shown) and further a respective electrical potential setting section referenced $24A_R$, $24A_G$, $24A_B$, $24B_R$, $24B_G$, $24B_B$, $24C_R$, $24C_G$, $24C_B$, $24D_R$, $24D_G$ and $24D_B$. Display 10 further includes a select driver 12 and a data driver 14. Select driver 12 is coupled to each of electrical potential setting sections $24A_R$, $24A_G$, $24A_B$, $24B_R$, $24B_G$ and $24B_B$ via select line $18_1$ and further to electrical potential setting sections $24C_R$, $24C_G$, $24C_B$, $24D_R$, $24D_G$ and $24D_B$ via select line $18_2$. Data driver 14 is coupled to each electrical potential setting sections $24A_R$ and $24C_R$ via data line $16_{1R}$, to each electrical potential setting sections $24A_G$ and $24C_G$ via data line $16_{1G}$, to each electrical potential setting sections $24A_B$ and $24C_B$ via data line $16_{1B}$, to each electrical potential setting sections $24B_R$ and $24D_R$ via data line $16_{2R}$, to each electrical potential setting sections $24B_G$ and $24D_G$ via data line $16_{2G}$ and to each electrical potential setting sections $24B_B$ and $24D_B$ via data line $16_{2B}$.

With reference to FIG. 1B, electrical potential setting section $24A_R$ includes a switch 30. Switch 30 is coupled with a capacitor 32, select line $18_1$ and data line $16_{1R}$. Select line $18_1$ controls the state of switch 30 to be either open (as shown in FIG. 1B) or closed (as shown in FIG. 1C). Data line $16_{1R}$ sets to a certain potential $V_1$, respective with a desired state of transmittance (e.g., transparent, opaque or various levels of semi-transparency), for the respective LCD layer (not shown). In FIG. 1B, capacitor 32 exhibits a potential $V_0$, wherein $V_0 \neq V_1$. In FIG. 10, select line $18_1$ changes the state of switch 30 from open to closed, thereby coupling data line $16_{1R}$ with capacitor 32 and setting capacitor 32 to exhibit potential $V_1$. Capacitor 32 induces this potential $V_1$ on to the respective LCD layer which in turn is set to the desired state of transmittance.

With reference to FIG. 1D, switch 30 is implemented in the form of a transistor 33, having a gate electrode 36, a drain electrode 34 and a source electrode 38. Gate electrode 36 is coupled with select line $18_1$, source electrode 38 is coupled with data line $16_{1R}$ and drain electrode 34 is coupled with capacitor 32 and further with LCD element R of sub-pixel $24A_R$. Select line $18_1$ controls the state of the transistor 33, in time to alternately be in either an open state, a closed/conductive state, a resistive state (i.e., partially/semi-conductive) and the like, coupling between date line $18_1$ and capacitor 32.

Reference is further made to FIG. 1E, which is a schematic illustration of an electrical potential setting section, generally referenced 44, which is known in the art. Electrical potential setting section 44 includes two switches $40_A$ and $40_B$. Each one of switches $40_A$ and $40_B$ is coupled with a capacitor 42, and further with LCD element R of a sub-pixel (not shown), a select line 48 and to a data line 46. Select line 48 operates switches $40_A$ and $40_B$ to simultaneously be in the same state, which is either an open state or a closed state. Data line 46 simultaneously sets a potential level $V_1$ at one end of switches $40_A$ and $40_B$. Once select line 48 sets switches $40_A$ and $40_B$ to the closed state, $40_A$ and $40_B$ connect data line 48 to capacitor 42, thereby charging capacitor 42 to potential level $V_1'$ and setting it to that potential level.

U.S. Pat. No. 8,832,748 to Bushell et al, entitled "Apparatus for aircraft dual channel display" directs to a display, which includes a pixel matrix, back light illumination and two video channels capable of displaying a video signal on the display panel. Each video channel includes respective column drivers, row drivers, LED drivers, timing controller, backlight controller, and a power source. The column and row drives of each channel couples to the columns and rows in the pixel matrix, such as a liquid crystal matrix and drives electrically isolated, interleaved color groups within each pixel. A switch provides for selecting between the two independent video channels to display a video signal on the display. In the display directed to by Bushell et al, each pixel includes two or four color groups of subpixels each group includes a red, a green and a blue subpixel. Each channel drives one color group or a pair of color groups. Such a configuration may provide even distribution of active sub-pixels upon failure of one of the channels.

SUMMARY OF THE PRESENT DISCLOSED TECHNIQUE

It is an object of the disclosed technique to provide a novel method and system for a fault tolerant display (i.e., the presented image is not affected or impaired) that is impervious to at least a single electronic failure in either the image generating electronics, or the driver electronics or the sub-pixel electronic elements or the interconnecting conductors.

In accordance with the disclosed technique, there is provided a display device including a plurality of pixels. Each of the pixels includes at least one sub-pixel. Each of the sub-pixels includes a drivable visual segment, a first electrical potential setting section and a second electrical potential setting section. The drivable visual segment, is operative to exhibit at least a first visible state and a second visible state. The first electrical potential setting section is coupled with the drivable visual segment and with a first select terminal and a first data terminal. The first electrical potential setting section is operative to drive the drivable visual segment, at least from the first visible state to the second visible state. The second electrical potential setting section is coupled with the drivable visual segment and with a second select terminal and a second data terminal. The second electrical potential setting section is operative to drive the drivable visual segment, independently from the first respective driver, at least from the first visible state to the second visible state.

In accordance with another aspect of the disclosed technique there is provided a method for operating a display multi-operation architecture of a multi-pixel display having a plurality of sub-pixels. Each of the sub-pixels includes a respective drivable visual segment and a respective electric potential retentioner coupled there between. The display multi-operation architecture couples to each one of the electric potential retentioners with a respective first switch, and further via a respective first data line and a respective first select line. The display multi-operation architecture further couples to each one of the electric potential retentioners with a respective second switch and further via a respective second data line and a respective second select line. The method including the procedures of:

providing access to the electric potential retentioner respective of a selected one of the at least one of the sub-pixels, by employing the first switch respective of the selected sub-pixel, via the respective first data line and the respective first select line; and, providing access to the electric potential retentioner respective of the selected one of the at least one of the sub-pixels, by employing the second switch respective of the selected sub-pixel, via the respective second data line and the respective second select line.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for redundantly operating pixels in a display unit. In accordance with the disclosed technique there is provided a configuration in which each sub-pixel includes a drivable visual segment (e.g., LCD layer, dynamic mirror), a potential retentioner (e.g., capacitor, a memory element), a first switch, coupled with a first select driver and a first data driver, and a second switch, coupled with a second select driver and a second data driver. Each one of the switches is operative, independently of the other switch, to be operated by the respective select driver, coupled therewith. Each one of the switches is operative, independently of the other switch, to set the capacitor to the potential provided thereto by the respective data driver, coupled therewith.

The following example is provided with respect to a color display, where each full color pixel includes three independently operable sub-pixels, a red sub pixel, a green sub pixel and a blue sub pixel, otherwise known in the art as the RGB chromatic scheme. The disclosed technique can easily apply to any other chromatic schemes, such as:

monochrome display where each pixel consists of a clear subpixel that can take any color of the backlight typically used in Head Up Displays, helmet displays.

two subpixels, red and green—typically used in Head Up Displays, helmet displays Four subpixels, red, green, blue, white typically used in high brightness displays.

Four subpixels red, green, blue, yellow and other combinations for specialty displays.

Five subpixels and more for specialty displays with increased color gamut or specialty mode dependent operation.

Figure 1A:
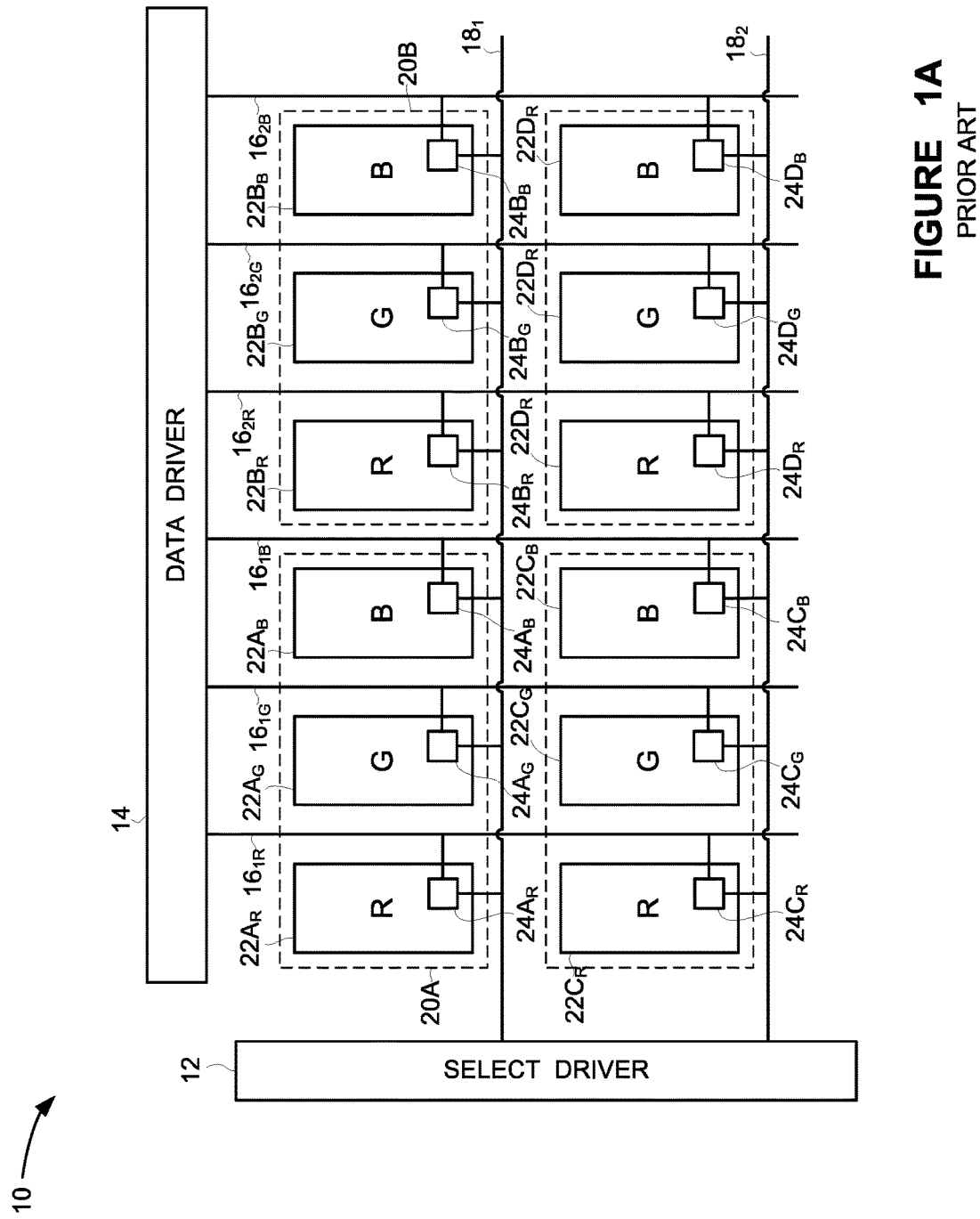
FIG. 1A is a schematic illustration of a conventional AMLCD display, which is known in the art.
Figure 1B:
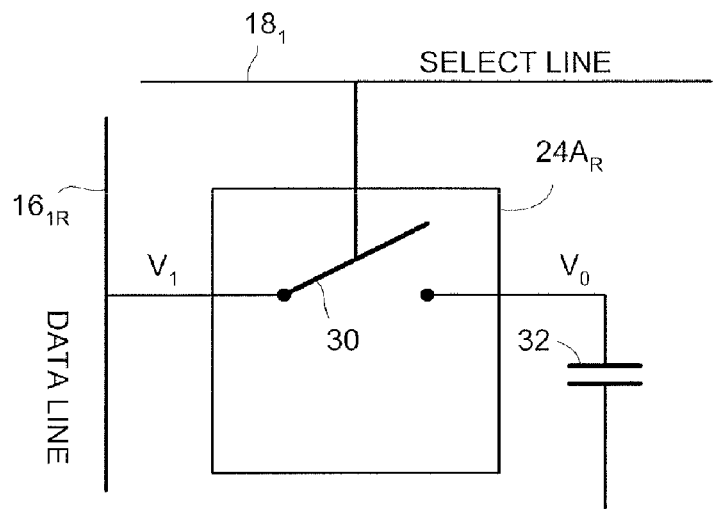
FIGS. 1B and 1C are schematic illustrations of a single electrical potential setting section of the display of FIG. 1A, which is known in the art, at different states.
Figure 1C:
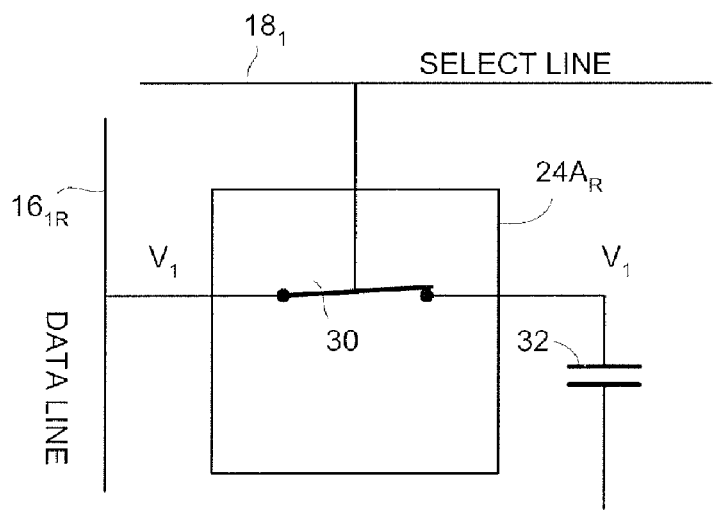
Figure 1D:
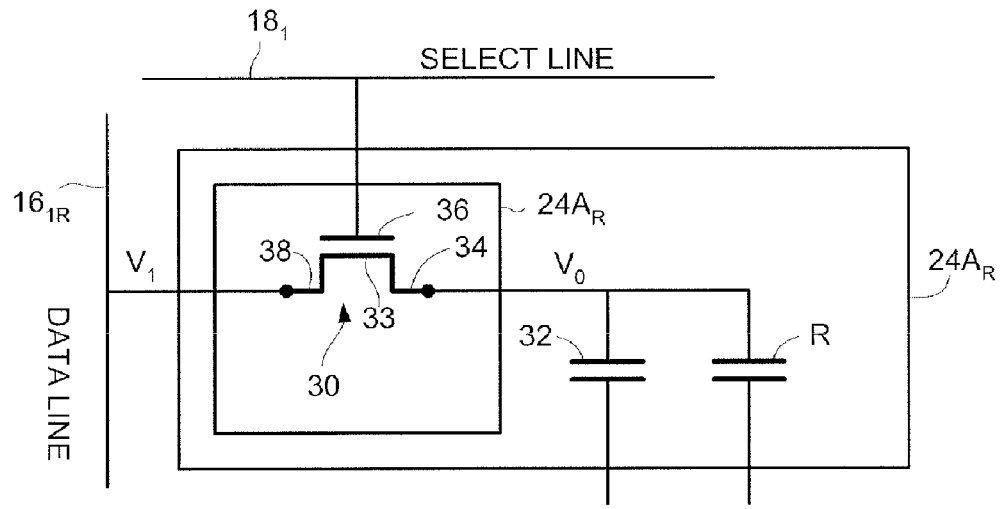
FIG. 1D is a schematic illustration of a specific implementation of a sub-pixel of display 10 of FIG. 1A, which is known in the art.
Figure 1E:
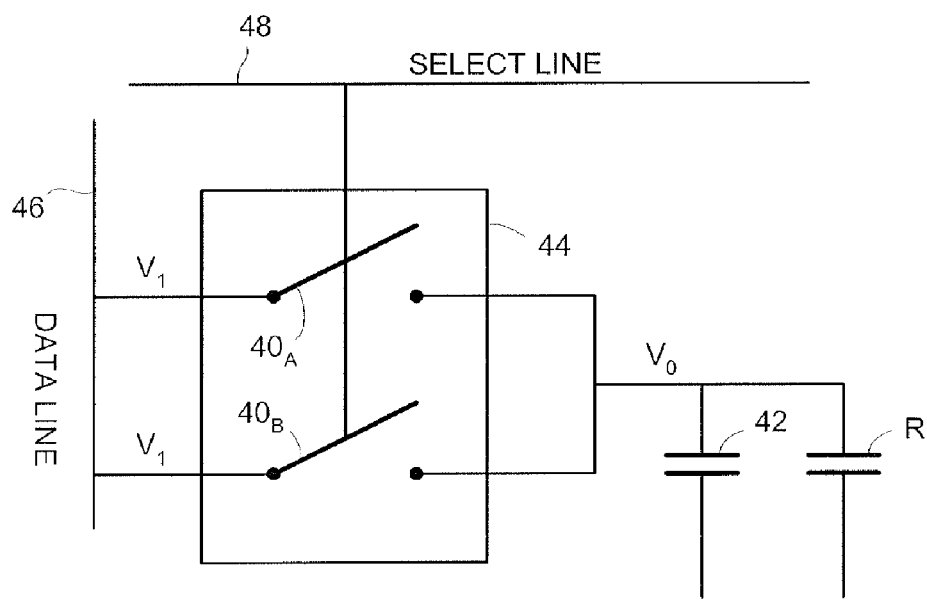
FIG. 1E is a schematic illustration of an electrical potential setting section, which is known in the art.
Figure 2:
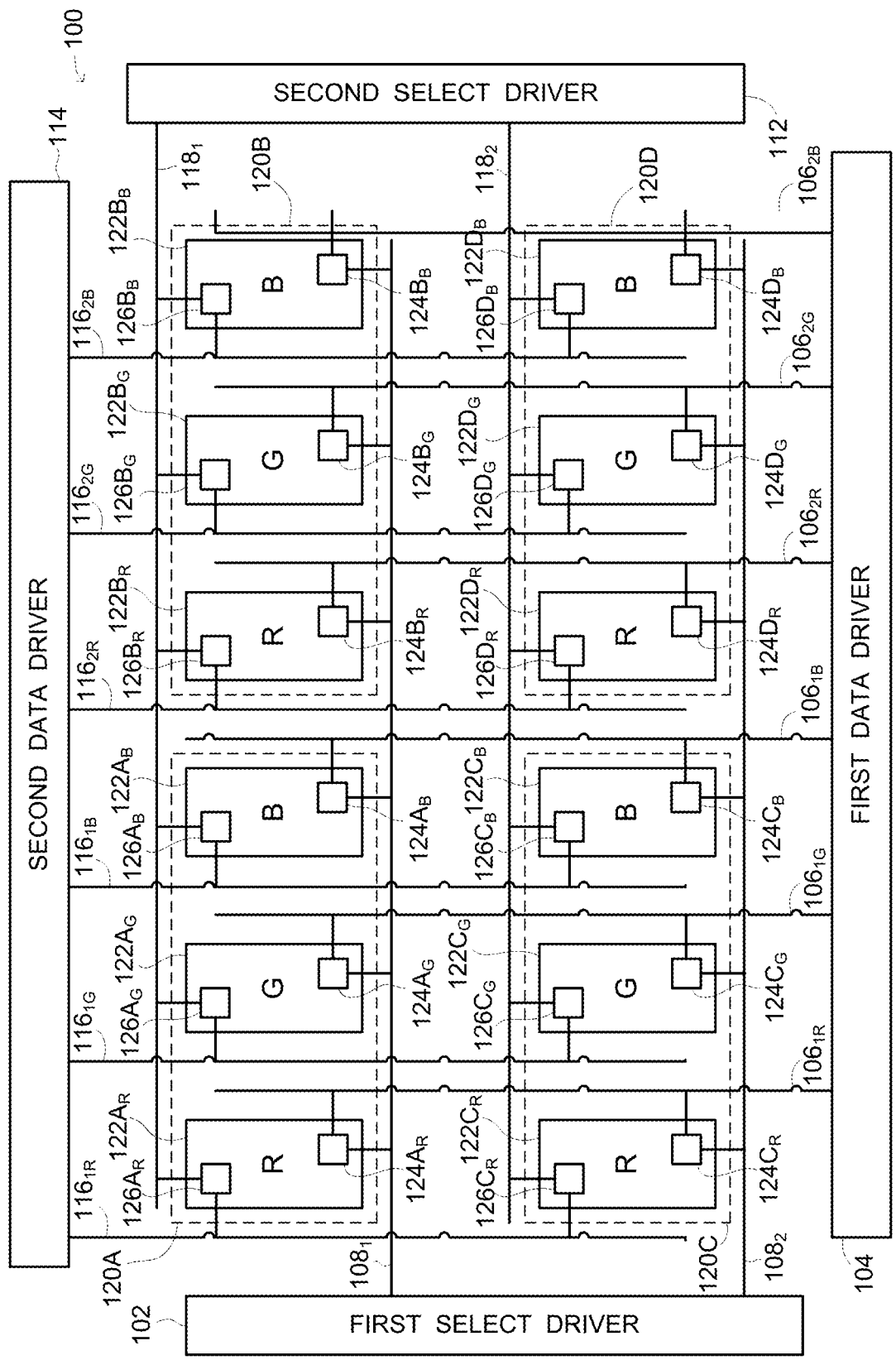
FIG. 2 is a schematic illustration of the display, constructed and operative in accordance with an embodiment of the disclosed technique.

Any one of these sub pixels can be set to a plurality of visible states, which are determined by the background illumination illuminating a given sub-pixel, the chromatic filter placed in front of it and the transparency level that the LCD layer is set to. Typically, setting a sub-pixel to a desired visible state (e.g., while refreshing the entire display) is carried out by setting the respective LCD layer to a desired transparency level, which is associated and required for that desired visible state. Transitions between visible states can be discrete (i.e., "jumping" from one visible state to another), gradual or continuous (i.e., "soft") by setting the LCD from one level of transparency to another (e.g., by setting the respective capacitor from a potential level $V_1$ to a potential level $V_2$ all at once or by setting an intermediate level $V_3$ or gradually, respectively. Reference is now made to FIG. 2, which is a schematic illustration of the display, generally referenced 100, constructed and operative in accordance with an embodiment of the disclosed technique. Display 100 includes a plurality of pixels 120A, 120B, 120C and 120D. Each of the pixels 120A, 120B, 120C and 120D includes three respective sub-pixels $122A_R$, $122A_G$, $122A_B$, $122B_R$, $122B_G$, $122B_B$, $122C_R$, $122C_G$, $122C_B$, $122D_R$, $122D_G$ and $122D_B$. It is noted that a typical display such as display 10, may contain any number of pixels (i.e., subject to manufacturing limitations) and further that each such pixel may include one or more sub-pixels, at any desired spectral range arrangement [provide examples]. Each of sub-pixels $122A_R$, $122A_G$, $122A_B$, $122B_R$, $122B_G$, $122B_B$, $122C_R$, $122C_G$, $122C_B$, $122D_R$, $122D_G$ and $122D_B$ includes a liquid crystal section directed at a predetermined wavelength range such as Red (R), Green (G) and blue (B), a respective capacitor (not shown), a first respective electrical potential setting section referenced $124A_R$, $124A_G$, $124A_B$, $124B_R$, $124B_G$, $124B_B$, $124C_R$, $124C_G$, $124C_B$, $124D_R$, $124D_G$, $124D_B$ and a second respective electrical potential setting section referenced $126A_R$, $126A_G$, $126A_B$, $126B_R$, $126B_G$, $126B_B$, $126C_R$, 1260, $126C_B$, $126D_R$, $126D_G$, $126D_B$.

Display 100 further includes a first select driver 102, a second select driver 112, a first data driver 104 and a second data driver 114. First select driver 102 is coupled to each of electrical potential setting sections $124A_R$, $124A_G$, $124A_B$, $124B_R$, $124B_G$ and $124B_B$ via select line $108_1$ and further to electrical potential setting sections $124C_R$, $124C_G$, $124C_B$, $124D_R$, $124D_G$ and $124D_B$ via select line $108_2$. First data driver 104 is coupled to each electrical potential setting sections $124A_R$ and $124C_R$ via data line $106_{1R}$, to each electrical potential setting sections $124A_G$ and $124C_G$ via data line $106_{1G}$, to each electrical potential setting sections $124A_B$ and $124C_B$ via data line $106_{1B}$, to each electrical potential setting sections $124B_R$ and $124D_R$ via data line $106_{2R}$, to each electrical potential setting sections $124B_G$ and $124D_G$ via data line $106_{2G}$ and to each electrical potential setting sections $124B_B$ and $124D_B$ via data line $106_{2B}$.

Second select driver 112 is coupled to each of electrical potential setting sections $126A_R$, $126A_G$, $126A_B$, $126B_R$, $126B_G$ and $126B_B$ via select line $118_1$ and further to electrical potential setting sections $126C_R$, $126C_G$, $126C_B$, $126D_R$, $126D_G$ and $126D_B$ via select line $118_2$. Second data driver 114 is coupled to each electrical potential setting sections $126A_R$ and $126C_R$ via data line $116_{1R}$, to each electrical potential setting sections $126A_G$ and $126C_G$ via data line $116_{1G}$, to each electrical potential setting sections $126A_B$ and $126C_B$ via data line $116_{1B}$, to each electrical potential setting sections $126B_R$ and $126D_R$ via data line $116_{2B}$, to each electrical potential setting sections $126B_G$ and $126D_G$ via data line $116_{2G}$ and to each electrical potential setting sections $126B_B$ and $126D_B$ via data line $116_{2B}$.

It is noted that each of the above potential setting sections is associated with a respective data terminal and a respective select terminal. Such a respective data terminal is formed from the data line coupled with a given potential setting section and from the respective data driver coupled with that data line. Such a respective select terminal is formed from the select line coupled with a given potential setting section and from the respective select driver coupled with that select line. With reference to FIG. 2, the select terminal of potential setting section $124A_G$ includes select line $108_1$ and select driver 102, while the data terminal of potential setting section $124A_G$ includes data line $106_{1G}$ and data driver 104.

Figure 3A:
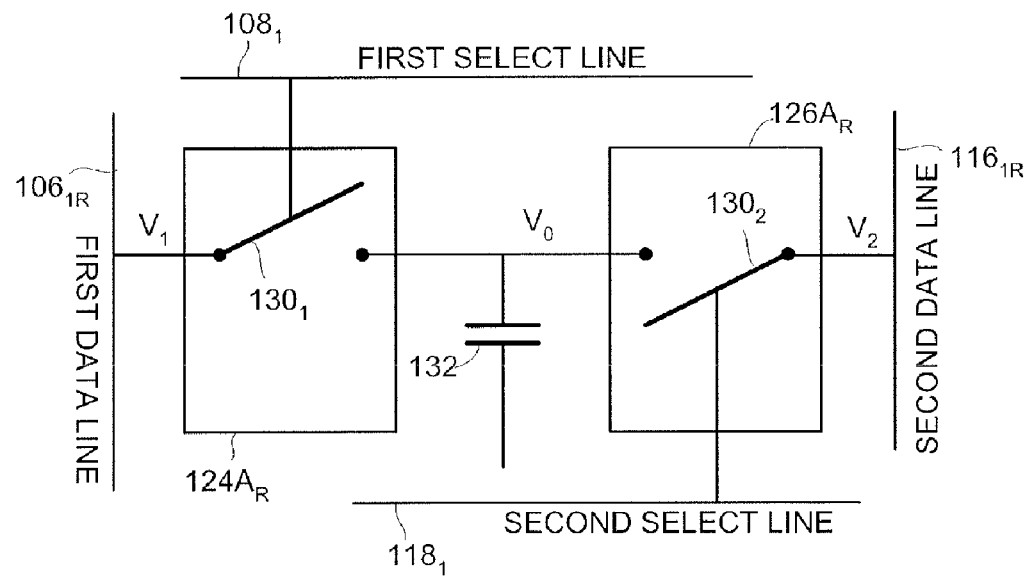
FIG. 3A is a schematic illustration of the first electrical potential setting section and of the second electrical potential setting section, of the display of FIG. 2, constructed and operative in a first mode of operation, in accordance with the disclosed technique.
Figure 3B:
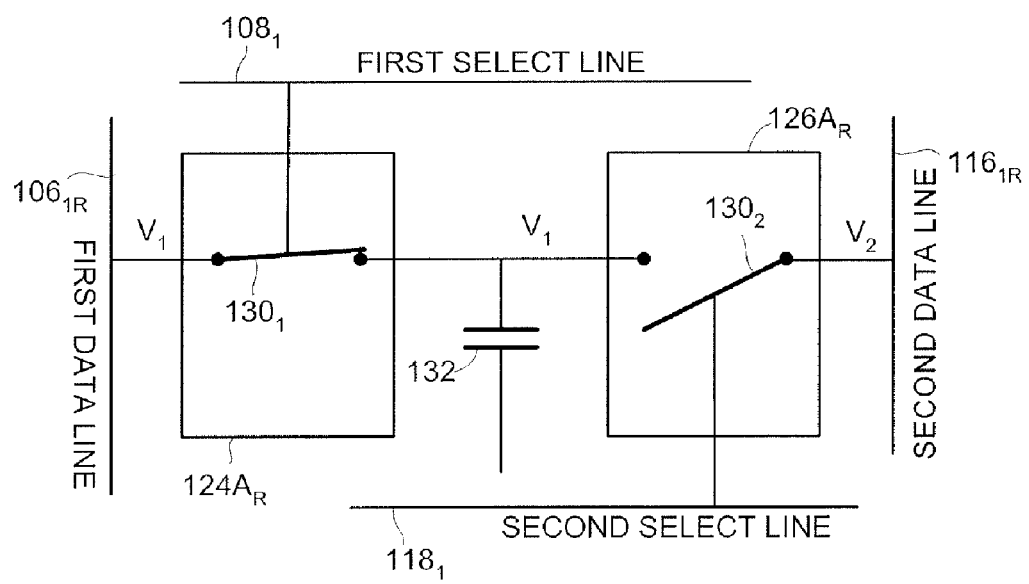
FIG. 3B is a schematic illustration of the first electrical potential setting section and of the second electrical potential setting section, of the display of FIG. 2, constructed and operative in a second mode of operation, in accordance with the disclosed technique.
Figure 3C:
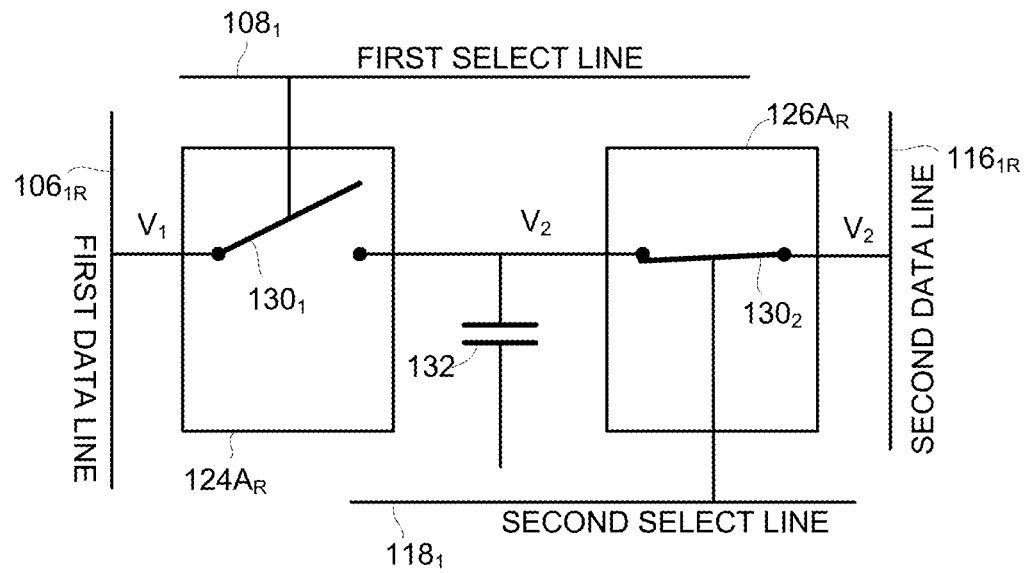
FIG. 3C is a schematic illustration of the first electrical potential setting section and of the second electrical potential setting section, of the display 100 of FIG. 2, constructed and operative in a third mode of operation, in accordance with the disclosed technique.
Figure 3D:
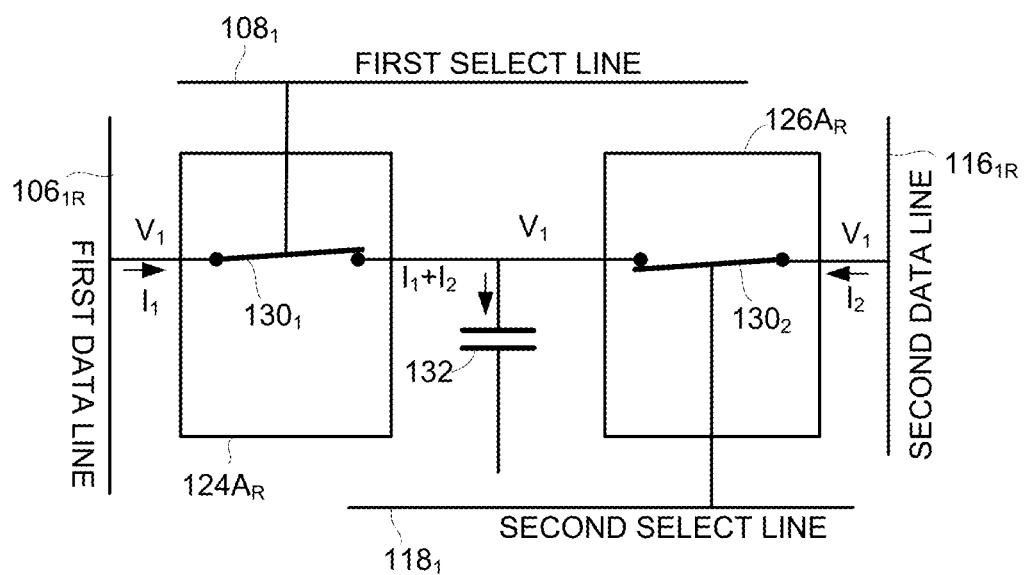
FIG. 3D is a schematic illustration of the first electrical potential setting section and of the second electrical potential setting section, of the display of FIG. 2, constructed and operative in a fourth mode of operation, in accordance with the disclosed technique.

Reference is further made to FIGS. 3A, 3B, 3C and 3D. FIG. 3A is a schematic illustration of first electrical potential setting section $124A_R$ and second electrical potential setting section $126A_R$, of display 100 of FIG. 2, constructed and operative in a first mode of operation, in accordance with the disclosed technique. FIG. 3B is a schematic illustration of first electrical potential setting section $124A_R$ and second electrical potential setting section $126A_R$, of display 100 of FIG. 2, constructed and operative in a second mode of operation, in accordance with the disclosed technique. FIG. 3C is a schematic illustration of first electrical potential setting section $124A_R$ and second electrical potential setting section $126A_R$, of display 100 of FIG. 2, constructed and operative in a third mode of operation, in accordance with the disclosed technique. FIG. 3D is a schematic illustration of first electrical potential setting section $124A_R$ and second electrical potential setting section $126A_R$, of display 100 of FIG. 2, constructed and operative in a fourth mode of operation, in accordance with the disclosed technique.

It is noted that first electrical potential setting section $124A_R$ and second electrical potential setting section $126A_R$, are both associated with sub-pixel $122A_R$ and with a capacitor 132, which serves as an electric potential retentioner, retaining the electric potential which sets the sub-pixel $122A_R$ LCD layer to a desired state of transmittance (e.g., transparent, opaque or various levels of semi-transparency).

Electrical potential setting section $124A_R$ includes a switch $130_1$. Electrical potential setting section $126A_R$ includes a switch $130_2$. Switch $130_1$ is coupled with capacitor 132, with first select line $108_1$ and with first data line $106_{1R}$. Switch $130_2$ is coupled with capacitor 132, with second select line $118_1$ and with second data line $116_{1B}$.

First select line $108_1$ controls the state of switch $130_1$ to be either open (as shown in FIGS. 3A and 3C) or closed (as shown in FIGS. 3B and 3D). In FIGS. 3A, 3B, 3C and 3D, first data line $106_{1R}$ is operable to set (i.e., setting only occurs in FIGS. 3B and 3D) Capacitor 132 to a certain potential $V_1$, respective with a first desired state of transmittance (e.g., transparent, opaque or various levels of semi-transparency), for the respective LCD layer (not shown).

Second select line $118_1$ controls the state of switch $130_2$ to be either open (as shown in FIGS. 3A and 3B) or closed (as shown in FIGS. 3C and 3D). Data line $116_{1R}$ sets to a certain potential $V_2$ (in FIGS. 3A, 3B and 3C), respective with a second desired state of transmittance (e.g., transparent, opaque or various levels of semi-transparency), for the respective LCD layer (not shown).

Having two complete redundant driving electronics, each sub-pixel of display 100 can be driven independently, by either the first select driver 102 and first data driver 104 or second select driver 112 and second data driver 114. Accordingly, power can be toggled between the first driving electronics (i.e., first select driver 102 and first data driver 104) and the second driving electronics (i.e., second select driver 112 and second data driver 114). For example, if either of first select driver 102 and first data driver 104 or at least one of the electrical potential setting sections coupled therewith (e.g., $124A_R$, $124A_G$, $124A_B$, $124B_R$, $124B_G$, $124B_B$, $124C_R$, $124C_G$, $124C_B$, $124D_R$, $124D_G$, $124D_B$) is malfunctioning, then power is cut off from first select driver 102 and first data driver 104 and is provided to second select driver 112 and second data driver 114, which in turn operate electrical potential setting sections $126A_R$, $126A_G$, $126A_B$, $126B_R$, $126B_G$, $126B_B$, $126C_R$, $126C_G$, $126C_B$, $126D_R$, $126D_G$, $126D_B$, based on the same display instructions, previously provided to first select driver 102 and first data driver 104. Other advantages of the disclosed technique shall be presented further below.

In FIG. 3A, capacitor 132 exhibits a potential $V_0$, wherein $V_2 \neq V_0 \neq V_1 \neq V_2$. In FIG. 3B, second select line $118_1$ maintains an open state for switch $130_2$ while first select line $108_1$ changes the state of switch $130_1$ from open to closed, thereby coupling first data line $106_{1R}$ with capacitor 132 and setting capacitor 132 to exhibit potential $V_1$. Capacitor 132 induces this potential $V_1$ on to the respective LCD layer which in turn is set to the first desired state of transmittance.

With reference to FIG. 3B, when, for example, one or more of first select driver 102, first data driver 104 or at least one of the electrical potential setting sections coupled therewith malfunctions, second select driver 106, second data driver 108 and the electrical potential setting sections coupled therewith are still operative to set the potential level of the capacitor respective of anyone of the sub-pixels of display 100.

Thus, the display panel may continue to display the full image (i.e., employing all of the pixels in the display panel).

In FIG. 3C, first select line $108_1$ maintains an open state for switch $130_1$ while second select line $118_1$ changes the state of switch $130_2$ from open to closed, thereby coupling second data line $116_{1R}$ with capacitor 132 and setting capacitor 132 to exhibit potential $V_2$. Capacitor 132 induces this potential $V_2$ on to the respective LCD layer which in turn is set to the second desired state of transmittance. It is noted that switch $130_2$ can set capacitor 132 to any desired potential, including $V_1$ (e.g., when switch $130_1$ or the electronics driving it are malfunctioning)

In FIG. 3D, both data lines $106_{1R}$ and $116_{1S}$ are set to a potential $V_1$. First select line $108_1$ changes the state of switch $130_1$ from open to closed thereby coupling first data line $106_{1R}$ with capacitor 132, while simultaneously second select line $118_1$ changes the state of switch $130_2$ from open to closed, thereby coupling second data line $116_{1R}$ with capacitor 132. Since both data lines $106_{1R}$ and $116_{1R}$ are set to a potential $V_1$ and are hence simultaneously coupled with capacitor 132, they set capacitor 132 to exhibit potential $V_1$, but typically faster than in the configuration disclosed in FIGS. 3B and 3C (had second data line been set to a potential $V_1$), since the current used to charge capacitor 132 is the sum of the current $I_1$ flowing through switch $130_1$ and the current I2 flowing thought switch $130_2$ (i.e., $I_1+I_2$). It is noted that typically current $I_1$ is limited by the material characteristics, which the LCD TFT transistors are made of.

Figure 3E:
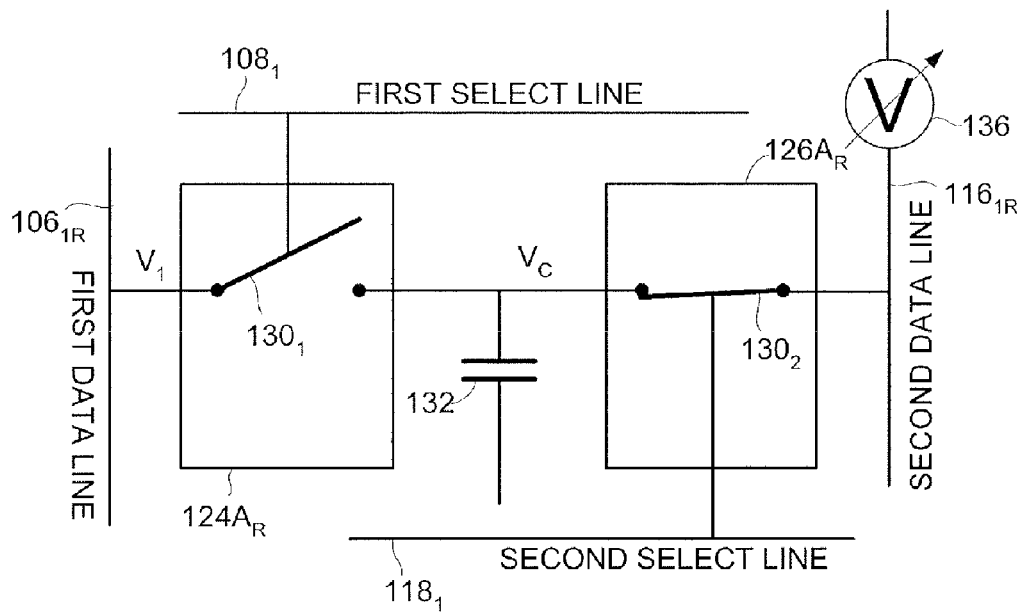
FIG. 3E is a schematic illustration of the first electrical potential setting section and of the second electrical potential setting section, of the display of FIG. 2, constructed and operative in a further mode of operation, in accordance with another embodiment of the disclosed technique.
Figure 3F:
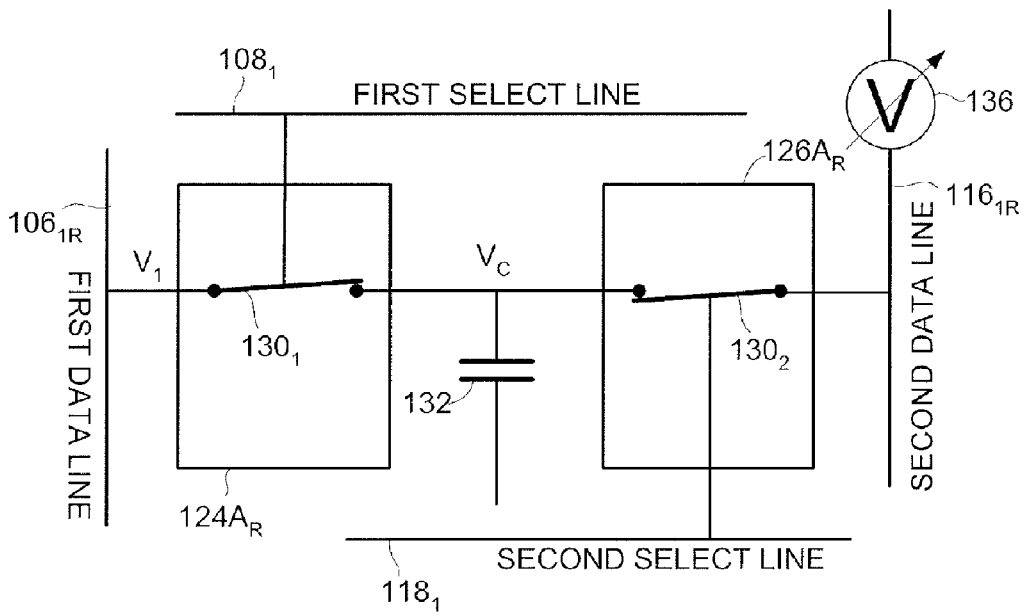
FIG. 3F is a schematic illustration of the first electrical potential setting section and of the second electrical potential setting section, of the display of FIG. 2, constructed and operative in another mode of operation, in accordance with a further embodiment of the disclosed technique.

Reference is also made to FIGS. 3E and 3F. FIG. 3E is a schematic illustration of first electrical potential setting section $124A_R$ and second electrical potential setting section $126A_R$, of display 100 of FIG. 2, constructed and operative in a further mode of operation, in accordance with another embodiment of the disclosed technique. FIG. 3F is a schematic illustration of first electrical potential setting section $124A_R$ and second electrical potential setting section $126A_R$, of display 100 of FIG. 2, constructed and operative in another mode of operation, in accordance with a further embodiment of the disclosed technique.

In FIGS. 3E and 3F, second data line $116_{1R}$ is further coupled with a potential sensor in the form of a voltmeter 136. In FIG. 3E, switch $130_1$ is open and switch $130_2$ is closed and hence, voltmeter can measure the potential $V_C$ of capacitor 132, uninterrupted by the potential V1, which first data line $106_{1R}$ sets. In FIG. 3F, both switches $130_1$ and $130_2$ are closed, and while voltmeter can measure the potential $V_C$ of capacitor 132, it can determine if $V_C$ has reached potential $V_1$ and thus detect that the mechanism which includes first select line $108_{1R}$, first data line $106_{1R}$ sets and switch $130_1$, is operating correctly (i.e., when $V_C=V_1$) or exhibits a malfunction (i.e., when $V_C \neq V_1$). It is noted that the disclosed technique may utilize any potential measuring device, which can measure potential either directly (e.g., a voltmeter, as in the present example) or indirectly, such as by means of current meter readout integration and optionally further taking into account the characteristics of other components such as the electric potential retentioner. Other types of measurements may replace potential measurement, such as current profile over time, current or potential derivative values and the like. All of the above measurements serve as quality measurements, which may indicate fault/malfunction in the process of setting the desired potential level of one or more potential retentioner. It is noted that a quality measurement unit (e.g., a voltmeter, an ampermeter) may be coupled to one or more of first select terminal, first data terminal, second select terminal and second data terminal. Such a measurement unit can be unique for a selected line, or allocated momentarily to a plurality of lines (i.e., data lines or select lines). In accordance with yet a further embodiment of the disclosed technique, a second data line such as $116_{1R}$ can be alternatively coupled with a potential source and with a potential sensor, such when the potential sensor detects a malfunction, the potential source coupled with that second data line (i.e., together with second select line and the second switch), can serve as backup for the "first" mechanism that includes the first select line, the first data line and the first switch.

Figure 4:
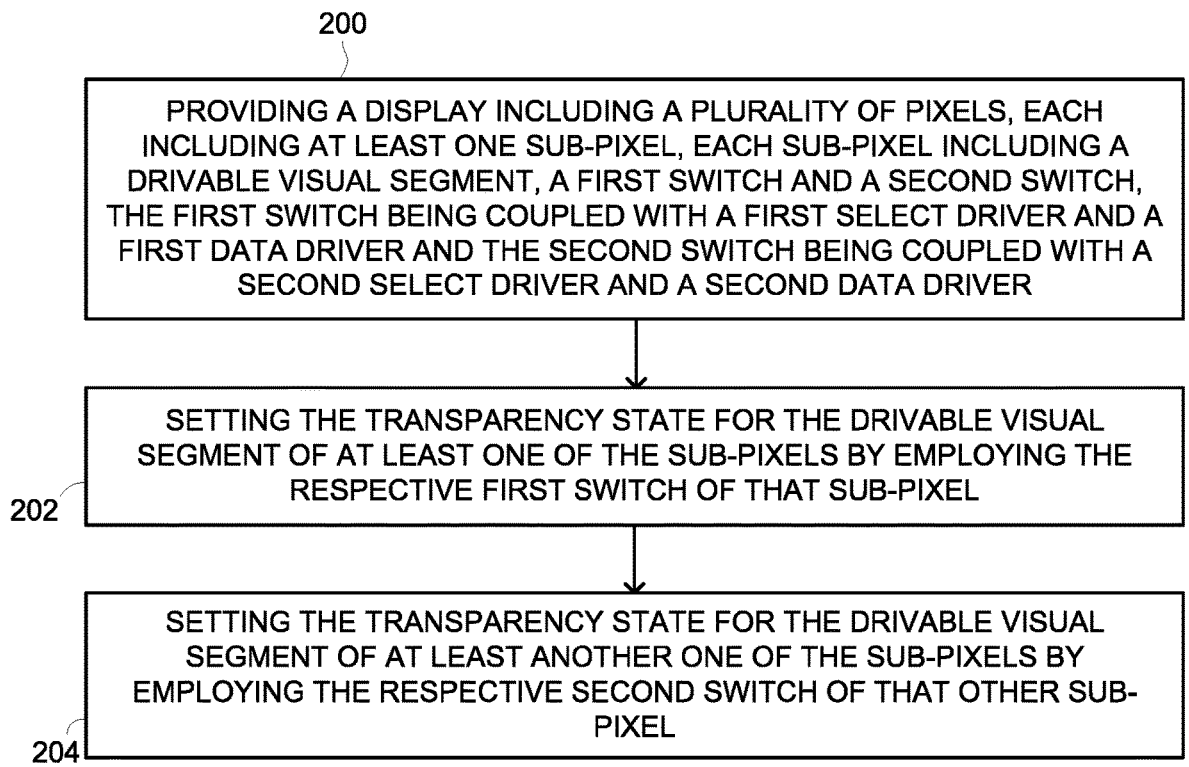
FIG. 4 is a schematic illustration of a method for operating a redundantly operable display, operative in accordance with a further embodiment of the disclosed technique.

Reference is now made to FIG. 4, which is a schematic illustration of a method for operating a redundantly operable display, operative in accordance with a further embodiment of the disclosed technique. In procedure 200 a redundantly operable display is provided. The display includes a plurality of pixels, each including at least one sub-pixel. Each sub-pixel includes a drivable visual segment, a first switch and a second switch, the first switch being coupled with a first select driver and a first data driver and the second switch being coupled with a second select driver and a second data driver.

In procedure 202, the transparency state for the drivable visual segment of at least one of the sub-pixels, is set by employing the respective first switch of that sub-pixel. With respect to FIG. 2, first electrical potential setting section $124A_R$, is employed to provide a first potential $V_1$ to the liquid crystal section R of sub-pixel $122A_R$. First potential $V_1$ corresponds to a desired first transparency level.

In procedure 204, the transparency state for the drivable visual segment of at least another one of the sub-pixels, is set by employing the respective second switch of that sub-pixel. With respect to FIG. 2, first electrical potential setting section $124A_G$, is employed to provide a second potential $V_2$ to the liquid crystal section G of sub-pixel $122A_G$. Second potential $V_2$ corresponds to a desired second transparency level.

It is noted that procedures 202 and 204 can be executed either in sequence or simultaneously. When executed simultaneously, procedures reduce the time required to refresh the entire display, by substantially half, since at each given moment, two sub-pixels are refreshed, instead of one. It is further noted that the method of FIG. 4, also serves in a situation wherein a certain sub-pixel can no longer be operated by its respective first electrical potential setting section, and is instead being operated by its respective second electrical potential setting section.

Figure 5:
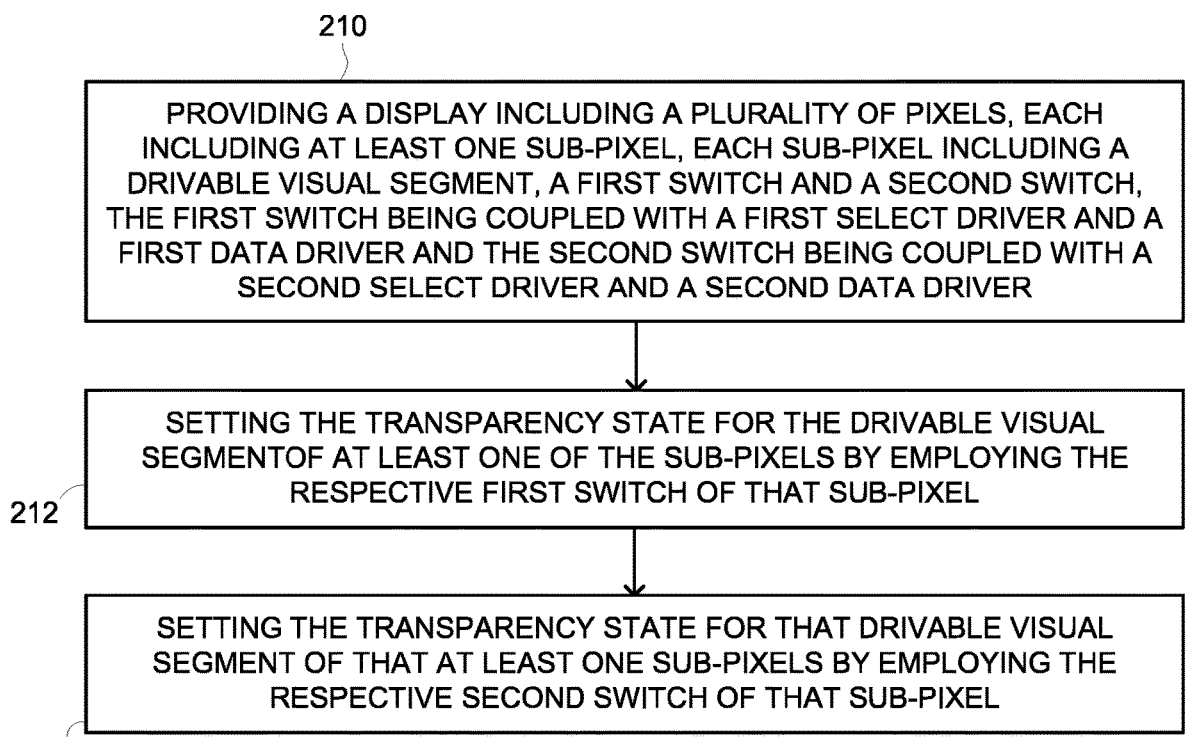
FIG. 5 is a schematic illustration of a method for operating a redundantly operable display, operative in accordance with yet another embodiment of the disclosed technique.

Reference is now made to FIG. 5, which is a schematic illustration of a method for operating a redundantly operable display, operative in accordance with yet another embodiment of the disclosed technique. In procedure 210 a redundantly operable display is provided. The display includes a plurality of pixels, each including at least one sub-pixel. Each sub-pixel includes a drivable visual segment, a first switch and a second switch, the first switch being coupled with a first select driver and a first data driver and the second switch being coupled with a second select driver and a second data driver.

In procedure 212, the transparency state for the drivable visual segment of at least one of the sub-pixels, is set by employing the respective first switch of that sub-pixel. With respect to FIG. 2, first electrical potential setting section $124A_R$, is employed to provide a first potential $V_1$ to the liquid crystal section R of sub-pixel $122A_R$. First potential $V_1$ corresponds to a desired first transparency level.

In procedure 214, the transparency state for the drivable visual segment of at least another one of the sub-pixels, is set by employing the respective second switch of that sub-pixel. With respect to FIG. 2, second electrical potential setting section $126A_R$, is employed to provide a second potential $V_1$ to the liquid crystal section R of sub-pixel $122A_R$. Second potential $V_1$ also corresponds to the desired first transparency level.

It is noted that procedures 212 and 214 can be executed either in sequence or simultaneously. When executed simultaneously, procedures reduce the time required to refresh the entire display, since at each given moment, two electrical potential setting sections are used to set the desired potential for the LCD layer of a given sub-pixel, at a current which exceeds the current provided by a single electrical potential setting section, thereby reducing the time required to charge the respective capacitor of that sub-pixel.

Figure 6:
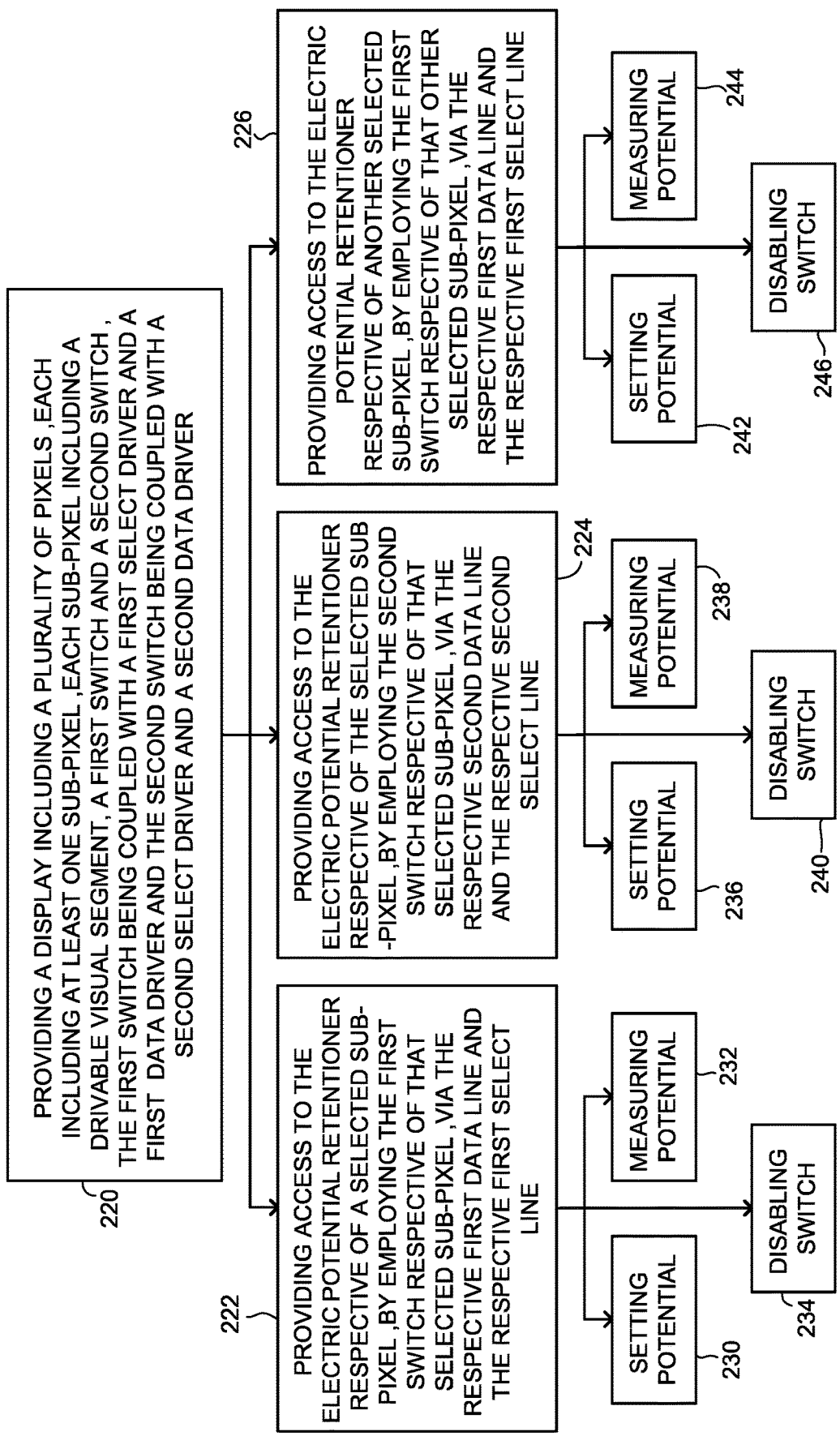
FIG. 6 is a schematic illustration of a method for operating a redundantly operable display, operative in accordance with yet further embodiment of the disclosed technique.

Reference is further made to FIG. 6, which is a schematic illustration of a method for operating a redundantly operable display, operative in accordance with yet another embodiment of the disclosed technique. In procedure 220, a display including a plurality of pixels is provided. Each of the pixels includes at least one sub-pixel. Each of the sub-pixels includes a drivable visual segment, a first switch and a second switch. The first switch is coupled with a first select driver and a second data driver. The second switch is coupled with a second select driver and a second data driver. With reference to FIG. 2, display 100 includes a plurality of pixels 120A, 120B, 120C and 120D, each including sub pixels such as $122A_R$, $12B_B$ and $122D_G$, each including a first switch (e.g., FIG. 3A) a second switch, wherein the first switches are each coupled to a first select driver 102 and a first data driver 104 and the second switches are each coupled to a second select driver 112 and a second data driver 114.

In procedure 222, access to the electric potential retentioner respective of a selected sub-pixel is provided, by employing the first switch respective of that selected sub-pixel, via the respective first data line and the respective first select line. In the example presented in FIG. 3A, access is provided to capacitor 132 by employing switch $130_1$ via first select line $108_1$ and first data line $106_{1R}$. The access provided in procedure 222 can be provided to a variety of actions such as setting potential to the potential retentioner denoted 230, measuring the potential of the potential retentioner denoted 232 and disabling the respective switch 234. In the example presented in FIG. 3B potential $V_1$ is set for capacitor 132. In the example presented in FIG. 3B potential $V_1$ is set for capacitor 132. In the example presented in FIG. 3E although the potential level of capacitor 132 is measured via switch $130_2$, it is noted that a similar technique can be applied for measuring that potential via switch $130_1$, by coupling a potential measuring unit with switch $130_1$. Finally, switch $130_1$ can be disabled via either one of select line $108_1$ and first data line $106_{1R}$ (disabling not shown).

In procedure 224, access to the electric potential retentioner respective of a selected sub-pixel is provided, by employing the second switch respective of that selected sub-pixel, via the respective second data line and the respective second select line. In the example presented in FIG. 3A, access is provided to capacitor 132 by employing switch $130_2$ via first select line $118_1$ and first data line $116_{1R}$. The access provided in procedure 224 can be provided to a variety of actions such as setting potential to the potential retentioner, as demonstrated in the example presented in FIG. 3B. Similar to procedure 222, the access provided in procedure 224 can be provided to a variety of actions such as setting potential to the potential retentioner denoted 236, measuring the potential of the potential retentioner denoted 238 and disabling the respective switch 240.

In procedure 226, access to the electric potential retentioner respective of another selected sub-pixel is provided, by employing the first switch respective of that other selected sub-pixel, via the respective first data line and the respective first select line. It is noted that since the configuration presented in FIG. 3A is applied for each of the sub-pixels of display 100, the description provided in conjunction with procedure 222 can be applied with respective components (not shown) for procedure 226. Similar to procedure 222, the access provided in procedure 226 can be provided to a variety of actions such as setting potential to the potential retentioner denoted 242, measuring the potential of the potential retentioner denoted 244 and disabling the respective switch 246.

It is further noted that the access provided in procedure 222, the access provided in procedure 224 and the access provided in procedure 226 can sequential or simultaneous (e.g., depending operational requirements).

It will be appreciated by persons skilled in the art that the disclosed technique is not limited to what has been particularly shown and described hereinabove. Rather the scope of the disclosed technique is defined only by the claims, which follow.

The invention claimed is:

1. A display device comprising:
   a plurality of pixels, each said pixels including at least one sub-pixel;
   each said sub-pixels comprising:
   a drivable visual segment, being operative to exhibit at least a first visible state and a second visible state;
   a first electrical potential setting section comprising a first switch coupled with said drivable visual segment and with a first select terminal and a first data terminal, said first switch of said first electrical potential setting section being operative to drive said drivable visual segment, at least from said first visible state to said second visible state;

a second electrical potential setting section comprising a second switch coupled with said drivable visual segment and with a second select terminal and a second data terminal, said second switch of said second electrical potential setting section being operative to drive said drivable visual segment, independently from said first switch of said first electrical potential setting section, at least from said first visible state to said second visible state; and an electric potential retentioner selected from the group consisting of: a capacitor and a memory element, wherein said electric potential retentioner is coupled to said first electrical potential setting section via said first switch and to said second electrical potential setting section via said second switch.

2. The display device according to claim 1, wherein transitioning from said first visible state to said second visible state is performed discretely.

3. The display device according to claim 1, wherein transitioning from said first visible state to said second visible state is performed continuously.

4. The display device according to claim 1, wherein:
said first select terminal comprises a first select line coupled with a first select driver;
said first data terminal comprises a first data line coupled with a first data driver;
said second select terminal comprises a second select line coupled with a second select driver; and
said second data terminal comprises a second data line coupled with a second data driver.

5. The display device according to claim 1, wherein said first select terminal and said first data terminal are operable independently of said second select terminal and said second data terminal.

6. The display device according to claim 1, wherein said electric potential retentioner is configured to retain respective electric potentials required for each of said first visible state and said second visible state, each said respective electric potentials being driven to by at least one of said first electrical potential setting section and said second electrical potential setting section.

7. The display device according to claim 2, wherein transitioning from said first visible state to said second visible state is carried out via at least a third visible state, requiring a respective electric potential.

8. The display device according to claim 1 further comprising at least one quality measurement unit, operative to access at least one of said first electrical potential setting section and said second electrical potential setting section, via at least one of the select terminal and the respective data terminal respective of said first electrical potential setting section and said second electrical potential setting section.

9. The display device according to claim 8 wherein said at least one quality measurement unit is a potential meter.

10. The display device according to claim 8 wherein said at least one quality measurement unit is a current meter.

11. A method for operating a display multi-operation architecture of a multi-pixel display having a plurality of sub-pixels, each said sub-pixels comprising a respective drivable visual segment and a respective electric potential retentioner coupled there between, wherein said electric potential retentioner is selected from the group consisting of: a capacitor and a memory element, said display multi-operation architecture coupling each said electric potential retentioner with a first switch and further via a respective first data line and a respective first select line, said display multi-operation architecture further coupling each said electric potential retentioner with a second switch and further via a respective second data line and a respective second select line, the method comprising the procedures of:

providing access to said electric potential retentioner respective of a selected one of said at least one of the sub-pixels, by employing said first switch respective of said selected sub-pixel, via said respective first data line and said respective first select line; and, providing access to said electric potential retentioner respective of said selected one of said at least one of the sub-pixels, by employing said second switch respective of said selected sub-pixel, via said respective second data line and said respective second select line.

12. The method according to claim 11, further comprising the procedure of disabling said first switch respective of said selected sub-pixel.

13. The method according to claim 11, wherein employing said first switch respective of said selected sub-pixel comprises setting said electric potential retentioner respective of said selected one of said at least one of the sub-pixels to a selected potential level by said first switch.

14. The method according to claim 11, wherein employing said second switch respective of said selected sub-pixel comprises setting said electric potential retentioner respective of said selected one of said at least one of the sub-pixels to a selected potential level by said second switch.

15. The method according to claim 11, wherein employing said first switch respective of said selected sub-pixel comprises measuring the potential level of said electric potential retentioner respective of said selected one of said at least one of the sub-pixels, via said first switch.

16. The method according to claim 11, wherein employing said second switch respective of said selected sub-pixel comprises measuring the potential level of said electric potential retentioner respective of said selected one of said at least one of the sub-pixels, via said second switch.

17. The method according to claim 11, further comprising the procedures of simultaneously accessing said selected one of said at least one of the sub-pixels via said second switch respective of selected one of said at least one of the sub-pixels and accessing said selected one of said at least one of the sub-pixels via said first switch respective of said selected one of said at least one of the sub-pixels.

18. The method according to claim 11, further comprising the procedures of:

providing access to said respective of another selected one of said at least one of the sub-pixels, by employing said first switch respective of said other selected sub-pixel, via the first data line respective of said other selected sub-pixel and the first select line respective;

simultaneously accessing said selected one of said at least one of the sub-pixels via said second switch respective of selected one of said at least one of the sub-pixels and accessing said other selected one of said at least one of the sub-pixels via said first switch respective of said other selected one of said at least one of the sub-pixels.

* * * * *